(12) United States Patent
Nakatani et al.

(10) Patent No.: US 7,668,882 B2
(45) Date of Patent: Feb. 23, 2010

(54) FILE SYSTEM MIGRATION IN STORAGE SYSTEM

(75) Inventors: Yoji Nakatani, Kanagawa (JP); Koji Sonoda, Kanagawa (JP); Kenji Kataoka, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 366 days.

(21) Appl. No.: 11/269,607

(22) Filed: Nov. 9, 2005

(65) Prior Publication Data

US 2007/0073782 A1  Mar. 29, 2007

(30) Foreign Application Priority Data

Sep. 27, 2005  (JP)  ............................. 2005-279211

(51) Int. Cl.
*G06F 12/00* (2006.01)
*G06F 15/177* (2006.01)
(52) U.S. Cl. ...................................... 707/205; 709/221
(58) Field of Classification Search ................ 707/200, 707/10, 205; 709/214, 217, 221, 229, 232; 711/112

See application file for complete search history.

(56) References Cited

U.S. PATENT DOCUMENTS

| | | | | |
|---|---|---|---|---|
| 5,873,085 | A * | 2/1999 | Enoki et al. ................... 707/10 |
| 6,157,959 | A * | 12/2000 | Bonham et al. ............. 719/313 |
| 6,169,979 | B1 * | 1/2001 | Johnson ...................... 705/412 |
| 6,654,830 | B1 * | 11/2003 | Taylor et al. ................. 710/74 |
| 6,671,773 | B2 | 12/2003 | Kazar et al. |
| 6,938,039 | B1 * | 8/2005 | Bober et al. ..................... 707/8 |
| 2002/0091828 | A1 * | 7/2002 | Kitamura et al. ............ 709/226 |
| 2003/0229645 | A1 * | 12/2003 | Mogi et al. ................. 707/102 |
| 2004/0064487 | A1 * | 4/2004 | Nguyen et al. .............. 707/204 |
| 2004/0133652 | A1 * | 7/2004 | Miloushev et al. .......... 709/214 |
| 2004/0186849 | A1 * | 9/2004 | Enko et al. ................... 707/102 |
| 2005/0267929 | A1 * | 12/2005 | Kitamura .................... 709/201 |
| 2006/0064466 | A1 * | 3/2006 | Shiga et al. ................. 709/214 |
| 2006/0090049 | A1 * | 4/2006 | Saika .......................... 711/162 |
| 2007/0055703 | A1 * | 3/2007 | Zimran et al. ............... 707/200 |

OTHER PUBLICATIONS

"Network File System (NFS) version 4 Protocol", Network Working Group, Request for Comments: 3530, pp. 58-61, IETF home page at the Internet URL: http://www.ietf.org/home.html.

* cited by examiner

*Primary Examiner*—Tony Mahmoudi
*Assistant Examiner*—Md. I Uddin
(74) *Attorney, Agent, or Firm*—Antonelli, Terry, Stout & Kraus, LLP.

(57) ABSTRACT

In a cluster type NAS, it is necessary to copy file data between disk devices of servers upon migration of a file system or a part of the file system. A server includes a control table for managing a file system or a part of the file system, and a mapping table for managing a relation between a logical device of a disk subsystem and a logical unit recognized by a server, and in response to an instruction to execute migration of the file system from a first server to a second server, the mapping table is referenced to send an instruction to update the relation between the logical device and the logical unit to the second server, and the second server newly recognizes a logical unit and updates a management server identifier of the control table.

23 Claims, 9 Drawing Sheets

FIG.4

| D-TREE NAME | PATH | SERVER ID |
|---|---|---|
| dt0 | /dira | sid1 |
| dt1 | /dirb | sid1 |
| dt2 | /dirc/subdir1 | sid2 |
| dt3 | /dirc/subdir2 | sid2 |
| ⋮ | ⋮ | ⋮ |

FIG.5

| D-TREE NAME | DEVICE NAME |
|---|---|
| dt0 | ldev0 |
|  | ldev1 |
| dt1 | ldev2 |
| dt2 | ldev3 |
|  | ldev4 |
|  | ldev5 |
| dt3 | ldev6 |
| ⋮ | ⋮ |

FIG.6

| DEVICE NAME | TARGET | LUN |
|---|---|---|
| ldev0 | t0 | LU0 |
| ldev1 | t0 | LU1 |
| ldev2 | t0 | LU2 |
| ldev3 | t1 | LU0 |
| ldev4 | t1 | LU1 |
| ldev5 | t1 | LU2 |
| ldev6 | t2 | LU0 |

FIG.7

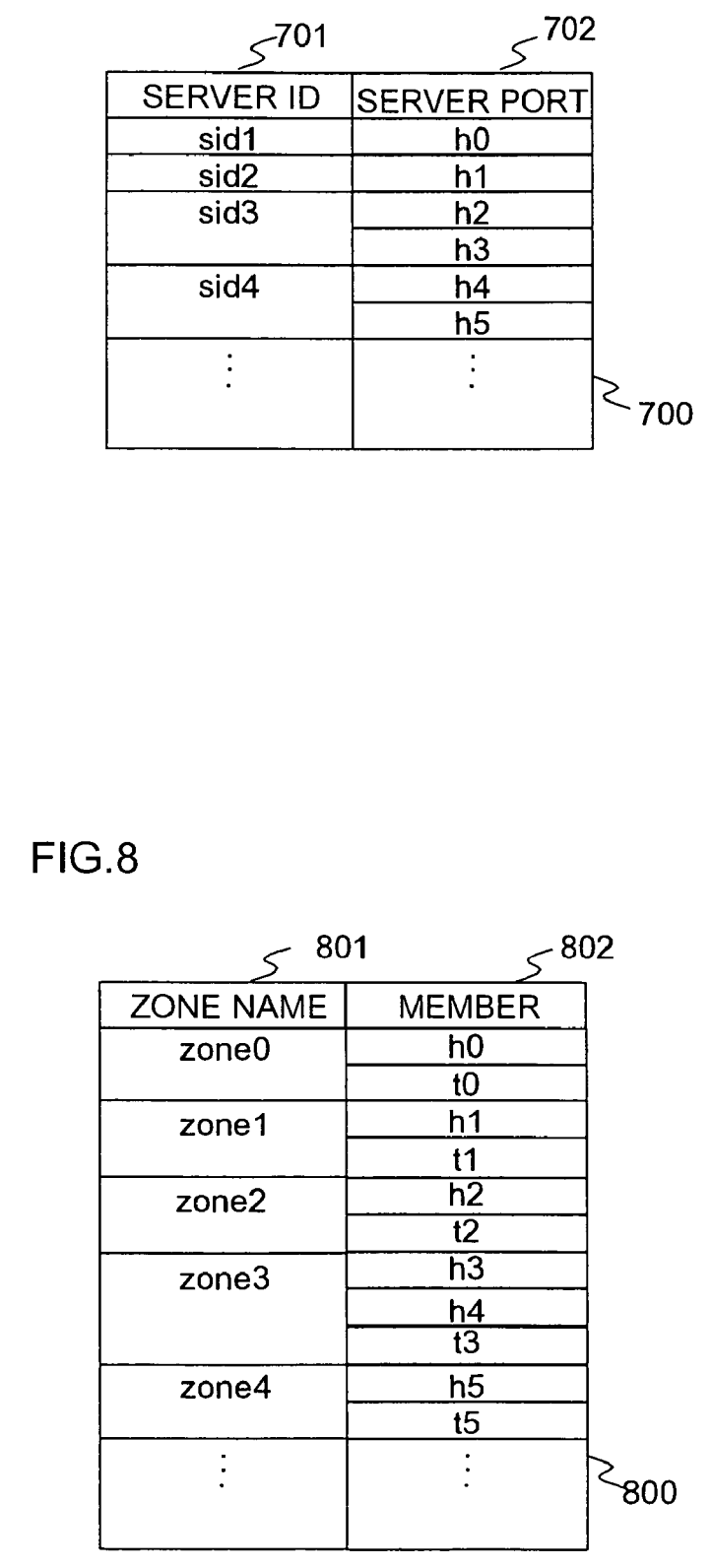

| SERVER ID | SERVER PORT |
|---|---|
| sid1 | h0 |
| sid2 | h1 |
| sid3 | h2 |
|  | h3 |
| sid4 | h4 |
|  | h5 |
| ⋮ | ⋮ |

| ZONE NAME | MEMBER |
|---|---|
| zone0 | h0 |
|  | t0 |
| zone1 | h1 |
|  | t1 |
| zone2 | h2 |
|  | t2 |
| zone3 | h3 |
|  | h4 |
|  | t3 |
| zone4 | h5 |
|  | t5 |
| ⋮ | ⋮ |

800

FILE SYSTEM MIGRATION IN STORAGE SYSTEM

The present application is based on and claims priority of Japanese patent applications No. 2005-279211 filed on Sep. 27, 2005, the entire contents of which are hereby incorporated by reference.

BACKGROUND OF THE INVENTION

1. Field of the Invention

The present invention relates to multiple file servers or a network attached storage (NAS), and to file system migration in the multiple file servers or the network attached storage (NAS).

2. Description of the Related Art

Hitherto, a network.attached storage (NAS) having a storage system connected to a network and used as a storage disk shared with a network-connected computer has been proposed. The NAS is composed of a server including a network interface, and a disk drive for storing data.

For example, U.S. Pat. No. 6,671,773 discloses a cluster type NAS having a plurality of servers each connected to a network. In the system disclosed in this publication, a network element, a switching element, and a disk element correspond to a server of the NAS. It is possible to provide a plurality of network elements that share a file system. Further, a plurality of disk elements enable disk-based migration. Further, the respective network elements can access all file systems of the disk elements. Even when a disk storing any file system migrates between the disk elements, the individual network elements can access all the file systems independently of the migration.

As an example of the file system for accessing files distributed on the network, a network file system (NFS) has been proposed. According to NFSv4 (RFC3530), which is the latest version (see, RFC3530, NFS version 4, pp. 58-61, on the IETF home page, when a file system migrates from one server to another, the server notifies a client of information about a location of a migration destination in response to an access to the file system from the client, and the client can access the file system at the migration destination in accordance with the notified information.

In the case of migrating a file system (or a part of the file system) in the cluster type NAS with servers, it is necessary to copy file data between disk devices in the individual servers of the NAS. This causes problems that the migration takes much time to execute, and a client's accessibility to the file is lowered due to file data copying for the migration.

For the purpose of making the data copying unnecessary during the migration, there has been proposed a method of sharing all the devices among all servers and changing the server to access a target device in response to the migration. In this case, however, all the servers need to recognize all the devices in the system. The number of devices recognized by one server is limited under the constraints on resources of the server. Owing to this upper limit, the number of devices in the system is limited.

SUMMARY OF THE INVENTION

The present invention has been completed in view of the above problems, and it is accordingly an object of the invention to provide a storage system including: a plurality of servers; and a disk subsystem connected to the plurality of servers and having a logical device storing all or a part of at least one file system, in which in response to an instruction to execute migration of the file system from a first server to a second server out of the plurality of servers, a relation between the logical device of the disk subsystem and a logical unit used for the servers to recognize the logical device is referenced to send an instruction to update the relation between the logical device and the logical unit to the second server, and the second server newly recognizes the logical unit and updates an identifier of the server managing all or a part of the file system.

According to the present invention, in a storage system including a plurality of servers, migration can be executed without copying a directory tree of a file system or a part of the file system. Further, a device is newly recognized upon the migration, whereby a large-scale system can be architected with no limits on the number of devices recognized by one server.

BRIEF DESCRIPTION OF THE DRAWINGS

FIG. 4 is an explanatory view of a mount point control table according to the first embodiment of the present invention;

FIG. 5 is an explanatory view of a directory tree control table according to the first embodiment of the present invention;

FIG. 6 is an explanatory view of a logic device mapping table according to the first embodiment of the present invention;

FIG. 7 is an explanatory view of a server port table showing a port of a server according to the first embodiment of the present invention;

FIG. 8 is an explanatory view of a zone control table according to the first embodiment of the present invention;

DESCRIPTION OF THE PREFERRED EMBODIMENTS

Hereinafter, description will be made of a first embodiment of the present invention with reference to the accompanying drawings.

Figure 1:
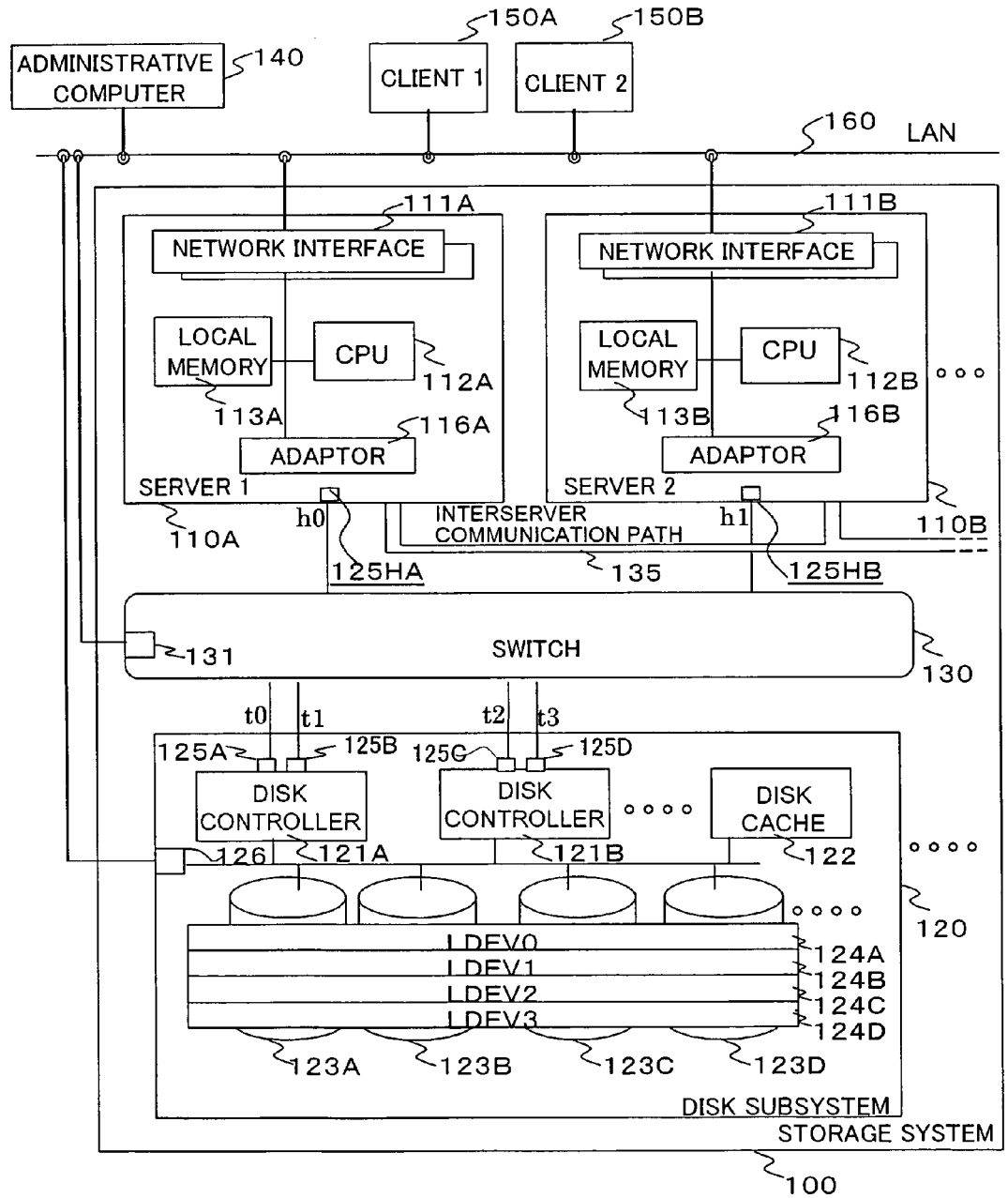
FIG. 1 is a block diagram showing the configuration of a storage system according to a first embodiment of the present invention.

FIG. 1 is a block diagram showing the configuration of a storage system according to the first embodiment of the present invention. A storage system 100 according to the first embodiment of the present invention is connected to an administrative computer 140 and clients 150 through a LAN 160.

The administrative computer 140 instructs servers 110 to create a file system in the storage system 100, and mount and migrate a file system or instructs a disk subsystem 120 or a switch 130 to change the settings of the disk subsystem 120 and the switch 130, respectively.

The clients 150 are computers for accessing a file in the storage system 100. More specifically, the clients 150 can write/read a file to/from the storage system 100. At this time, the file system of the storage system is used.

FIG. 1 illustrates two clients (150A and 150B), but an arbitrary number of clients 150 may be connected to the LAN 160 to access the storage system 100. The LAN 160 is, for example, a network that enables communications on the basis of TCP/IP or other such protocols.

The storage system 100 is a so-called network attached storage (NAS). The storage system 100 includes a plurality of servers 110, the disk subsystem 120, and the switch 130 interconnecting the servers 110 and the disk subsystem 120. The switch 130 is, for example, a Fibre Channel (FC) switch. A plurality of the switches 130 may be provided to compose a storage area network (SAN). Alternatively, the switch 130 may be a switch for the LAN or a switch dedicated to the storage system.

The servers 110 access the disk subsystem 120 in response to an access request from the clients 150.

The storage system 100 includes the plurality of servers 110. FIG. 1 illustrates two servers (110A and 110B) The storage system 100 may include any number of servers as the plurality of servers 110. Further, the servers 110 are each called a NAS head or NAS node. Note that the plurality of servers 110 may be configured in the clustered organization.

The server 110A is composed of a network interface 111A, a CPU 112A, a local memory 113A, and an adaptor 116A. The network interface 111A is connected to the LAN 160 to enable communications with the administrative computer 140 or the clients 150. The CPU 112A is a processing unit for controlling the operation of the server 110A. To be specific, the CPU 112A executes a program stored in the local memory 113A.

The local memory 113A is, for example, a semiconductor memory, which stores a program executed by the CPU 112A or data referenced by the CPU 112A. To be specific, the local memory 113A stores server software as a program and in addition, a mount point control table 400, a directory tree control table 500, a logical device mapping table 600, and a zone control table 700, as mentioned below.

The adaptor 116A is an interface connected to the switch 130 to enable communications with the disk subsystem 120.

The server 110B includes, similarly to the server 110A, a network interface 111B, a CPU 112B, a local memory 113B, and an adaptor 116B, which are the same as the network interface 111A, the CPU 112A, the local memory 113A, and the adaptor 116A, respectively, and description of which is omitted here.

Even in the case of providing any number of servers (servers 110), the configuration of each server is the same as that of the server 110A.

In the case where the storage system 100 includes the plurality of servers 110, the servers are connected to one another via an interserver communication path 135. The servers 110 can communicate with one another through the interserver communication path 135. To be specific, when information in the mount point control table 400 of one of the servers 110 is updated, the updated information is sent to another server 110 via the interserver communication path 135. The updated information is reflected in the mount point control table 400 of the other server 110.

In the first embodiment, as shown in FIG. 1, the interserver communication path 135 is provided independently of the switch 130 and the LAN 160. However, the servers 110 may communicate with one another via the switch 130 or the LAN 160. Alternatively, the servers 110 may communicate with each other using a disk cache 122 of the disk subsystem 120. That is, when the mount point control table 400 of one of the servers 110 is updated, the server 110 in question writes the updated information to the disk cache 122. Other servers 110 read the updated information written to the disk cache 122, and the mount point control tables 400 of the other servers 110 are updated. Thus, the present invention can be implemented irrespective of which route is used for communications between the servers 110.

The disk subsystem 120 is composed of a disk controller 121, a disk cache 122, and a disk drive 123.

The disk controller 121 includes at least one port 125 connected to the switch 130 to enable communications with the server 110 and control of the disk subsystem 120. More specifically, the disk controller 121 communicates with the server 110 via the switch 130 to write/read data to/from the disk drive 123 in response to a request from the server 110.

The disk cache 122 is, for example, a semiconductor memory for temporarily storing data to be written to the disk drive 123 or data read from the disk drive 123.

The disk drive 123 is a hard disk drive for storing data. The disk subsystem includes an arbitrary number of disk drives 123. The disk drives 123 may constitute a RAID. In FIG. 1, four disk drives (123A to 123D) are illustrated.

A storage area of the disk drive 123 is divided into an arbitrary number of logical devices (LDEVs) 124. The LDEV is an area that the disk controller 121 regards as a logical disk drive. If the disk drives 123 constitute the RAID, as shown in FIG. 1, one LDEV 124 may be composed of storage areas of a plurality of disk drives. A size of each LDEV 124 is arbitrarily set.

FIG. 1 illustrates four LDEVs (124A to 124D). Each LDEV is assigned with an LDEV identifier (ID). In the illustrated example of FIG. 1, the IDs of the LDEVs 124A to 124D are LDEV0 to LDEV3, respectively. Hereinafter, each LDEV 124 is represented by the corresponding LDEV ID (LDEV0 to LDEV3).

The storage system 100 may include a plurality of disk subsystems 120. In this case, each disk subsystem 120 is connected to the switch 130, so each server 110 can access any of the disk subsystems 120 via the switch 130.

The switch 130 and the disk subsystem 120 have a management port 131 and a management port 126, respectively, which are connected to the LAN 160. The information about settings of the switch 130 and the disk subsystems 120 can be referenced and updated by the administrative computer 140 by way of the LAN 160 through the administrative ports (131 and 126).

Figure 13:
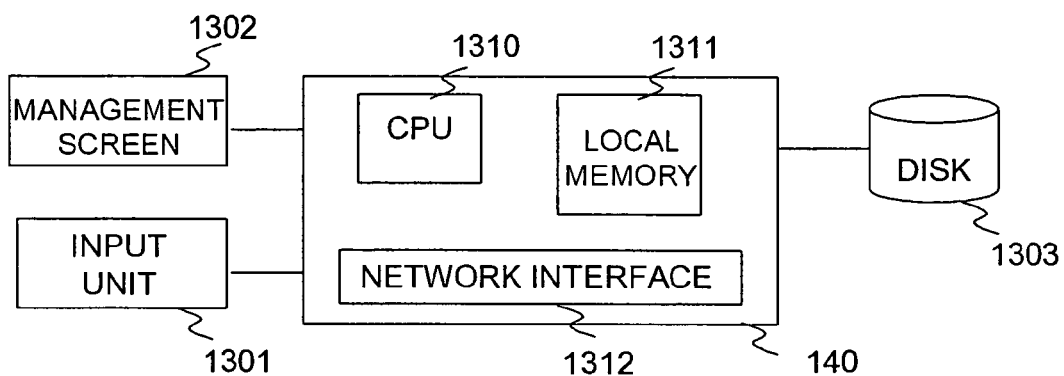
FIG. 13 is an explanatory view showing the configuration of an administrative computer.

FIG. 13 is a diagram showing the administrative computer 140.

The administrative computer 140 includes at least an input unit 1301, a management screen 1302, and a disk 1303. The input unit 1301 is, for example, a keyboard or a pointing device. The information displayed on the management screen and the operation with the pointing device are described later in detail (see FIGS. 10 and 11).

The administrative computer 140 includes a CPU 1301 and a local memory 1311, and reads a program for executing communications with the server or optionally a program for managing the disk subsystem, from the disk 1303 to the local memory 1311 to execute the program by use of the CPU 1310. The administrative computer 140 further includes a network interface 1312 for communicating with the server 110 or the disk subsystem 120.

Figure 2:
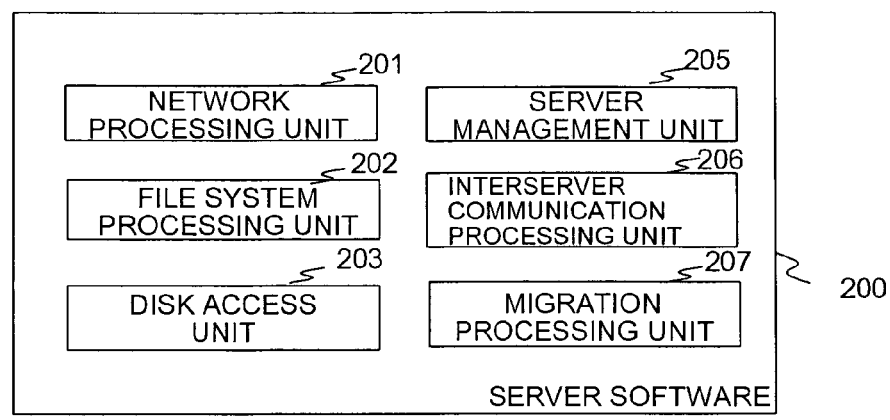
FIG. 2 is an explanatory view showing the configuration of server software according to the first embodiment of the present invention.

FIG. 2 illustrates the configuration of server software 200 according to the first embodiment of the present invention.

The server software 200 includes a network processing unit 201, a file system processing unit 202, a disk access unit 203, a server management unit 205, an interserver communication processing unit 206, and a migration processing unit 207, as programs run on the CPU 112.

The network processing unit 201 is a program for controlling communications between the administrative computer 140 and the client 150 via the LAN 160.

The file system processing unit 202 is a program for responding to a request from the client 150 to access a file in the file system 202. To be specific, the file system processing unit creates a new file system in response to an instruction from the administrative computer 140, for example. Alternatively, if the client 150 sends a request to acquire a file handle as a file identifier while designating a directory name or file name, for example, the program executes name resolution to send the file handle back to the client. Further, if the directory name or file name accepted by the client 150 belongs to a directory tree managed by another server 110, the program sends an ID of the server 111 managing the directory tree back to the client.

The disk access unit 203 is a program for executing an access to data in the file system 202 in response to an access request from the client 150.

The server management unit 205 is a program for setting the NAS through communications with the administrative computer 140. For example, upon receiving an instruction to create a new file system from the administrative computer 140, the server management unit 205 sends the instruction to the file system processing unit 202 and lets the file system processing unit create a new file system. Further, upon receiving a migration instruction from the administrative computer 140, the program sends the instruction to the migration processing unit 207 and lets the migration processing unit 207 execute the file migration.

The interserver processing unit 206 is a program for controlling communications between the servers 110 via the interserver communication path 135. For example, when the mount point control table 400 of one of the servers 110 is updated, the interserver communication processing unit 206 sends the updated information to another server 110.

The migration processing unit 207 is a program for executing the file migration. This program will be described in detail later (see FIG. 8).

Figure 3:
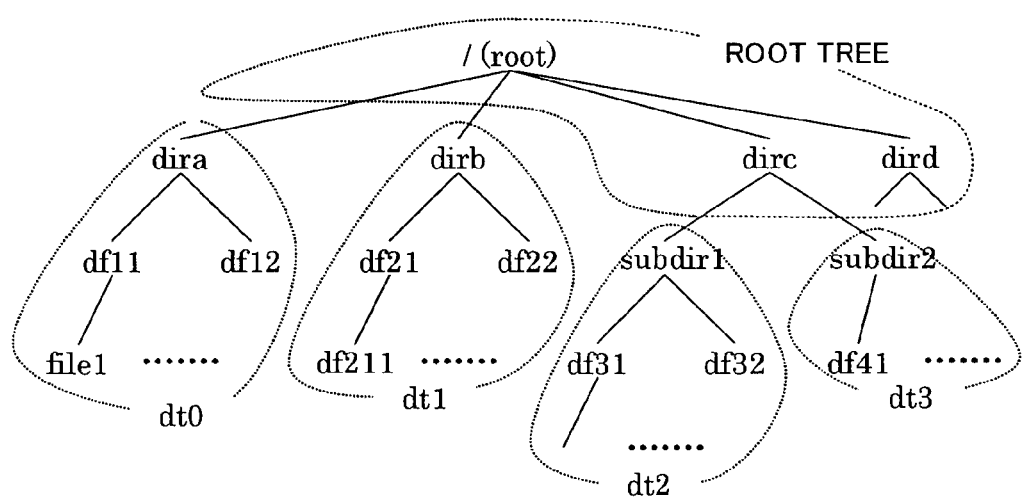
FIG. 3 is an explanatory view of a name space presented for a client according to the first embodiment of the present invention.

FIG. 3 is an explanatory view of a name space presented for the client 150 in the first embodiment of the present invention. FIG. 3 illustrates a minimum number of directories and files for ease of explanation. However, each file system 202 may include any number of directories and files.

In FIG. 3, a directory tree "dt0" includes a top directory to which directories "df11" and "df12" belongs with a file "file1" further belonging to the directory "df11".

In FIG. 3, a root directory "/" and a directory "dirc" are provided for mounting "dt0" to "dt3" and providing common name space, and called a "root tree".

The directory trees "dt0" to "dt3" indicate directory trees of a file system or a part of the file system.

The directory tree "dt0" is mounted under the root tree "/dira". Therefore, the top directory of the directory tree "dt0" is a directory "dira" under the directory "/" (root directory). At this time, a path of the file "file 1" is represented as "/dira/df11/file1".

Likewise, the directory tree "dt1" includes directories "df21" and "df22" under the top directory with the directory "df21" being followed by "file2". The "dt1" is mounted under the root tree "dirb" (see FIG. 4). Therefore, the top directory of the directory tree "dt1" is the directory "dirb" under the root directory. At this time, a path of the file "file2" is represented as "/dirb/df21/file2".

The "dt2" includes directories "df31" and "df32" under the top directory. The directory tree "dt2" is mounted under "/dirc/subdir1". Therefore, the top directory of the directory tree "dt2" is "subdir1" following the directory "dirc" under the root directory.

The directory tree "dt3" includes a director "df41" under the top directory. The directory tree "dt3" is mounted under "/dirc/subdir2". Therefore, the top directory of the directory tree "dt3" is "subdir2" following the directory "dirc" under the root directory.

The mount point control table 400 of each server 110 stores the same information, so each server 110 provides the client 150 with the same name space (FIG. 3).

Each server 110 can execute the name resolution in the root file system and the name resolution in a corresponding root directory tree which the server controls.

For example, if the server 110A manages the directory tree "dt0", and the server 110B manages the directory tree "dt1", when the server 110B receives a request to access the "/dira/df11/file1", the server 110B can execute the name resolution in the root directory but cannot execute the name resolution in the directory "dira". At this time, the server 110B references the mount point control table 400 to notify the client 150 as a request sender that the directory "dira" is under the control of the server 110A. The client 150 having received the notification issues an access request to the server 110A to allow the access to the "/dira/df11/file1".

In the above example, when sending a request for name resolution of a file outside the directory tree managed by the server 110B, the client 150A is notified of the server name (server 110A) of the server managing the directory tree. Instead of the notification, it is possible to transfer the name resolution request from the client 150 to the server 110A to let the server A execute the name resolution.

FIG. 4 is an explanatory view of the mount point control table 400 according to the first embodiment of the present invention.

The mount point control table 400 manages a mount state of a file system in the disk subsystem 120 or a directory tree as a part of the file system. The mount point control table 400 includes a D-tree name 401, a path 402, and a server ID 403.

One entry (line) of the mount point control table 400 corresponds to one directory tree. The D-tree name 401 is an ID of a mounted directory. In the illustrated example, four directory trees (dt0 to dt3) are mounted.

The path 402 indicates a mount point of each directory tree. In the illustrated example of FIG. 4, the directory tree "dt0" is mounted under "/dira". Likewise, the directory tree "dt1", "dt2", and "dt3" are mounted under "/dirb", "/drc/subdir1", and "/dirc/subdir2". The name space provided for when each file system is mounted as shown in FIG. 4 is as described above with reference to FIG. 3.

The server ID 403 is a unique identifier of the server 110 managing each directory tree. Each server 110 can access only the directory tree managed by the server 110. That is, in order to access a file, the client 150 sends an access request to the server 110 managing the directory tree including the file.

In the illustrated example of FIG. 4, "sid1" represents an ID of the server 110A, and "sid2" represents an ID of the server 110B. That is, the server 110A manages the directory tree "dt0" and the directory tree "dt1", and the server 110B manages the directory trees "dt2" and "dt3".

Upon the migration of the directory tree, the information on the server ID 403 is updated. For example, when the directory tree "dt0" migrates from the server 110A to the server 110B, the server ID 403 of the dt0 is updated from "sid1" to "sid2". Further, the updated information is notified to all the servers 110 in the storage system 100 through the interserver communication path 135. In response to the notification, the server 110 updates the mount point control table 400. As a result, the same information is stored in the mount point control tables 400 of all the servers 110.

FIG. 5 is an explanatory view of the directory tree control table 500 according to the first embodiment of the present invention.

The directory tree control table manages a directory tree in the name space (FIG. 3) presented for the client from the storage system 100, and lists logical devices (LDEVs) 124 of the disk subsystem 120 storing each directory tree.

The D-tree name 501 indicates an ID of the directory tree. The device name 502 indicates a name (ID) of the LDEV 124 in the disk subsystem storing the directory tree assigned with a corresponding ID. In the illustrated example of FIG. 5, "ldev0" and "ldev1" are set as the device name with respect to the directory tree dt0. This means that the directory tree "dt0" is stored in two LDEVs 124 (ldev0 and ldev1).

Note that the name of the LDEV 124 in the disk subsystem 120 is used as the device name 502 of the directory tree control table 500. However, if the storage system 100 includes a plurality of disk subsystems 120, it is necessary to use as the device name 502 a unique name of the LDEV 124 shared among the plurality of disk subsystems 120 or a combination of a disk subsystem name (not shown) for identifying the disk subsystem 120 and the unique name of the LDEV 124 shared among the disk subsystem 120.

FIG. 6 is an explanatory view of the logical device mapping table 600 according to the first embodiment of the present invention.

The logical device mapping table 600 indicates the way to designate one of the LDEVs 124 in the disk subsystem 120 at the time when the server 110 issues an update or reference request to the LDEV 124 by way of the switch 130.

The logical device mapping table 600 includes a device name 601, a target 602, and a LUN 603.

The device name 601 indicates a name (ID) for identifying a target LDEV 124.

The target 602 is a name (ID) for identifying the port 125 of the disk controller 121 connected to the target LDEV 124. If the switch 130 between the server 110 and the disk subsystem 120 is a FC switch, the target is a worldwide name (WWN) or port ID.

The LUN 603 is a number (logical unit number) for identifying a logical unit (corresponding to the LDEV 124) in the target 602.

The device name 601 is an ID used for the disk subsystem 120 to identify the LDEV 124. The server 110 can recognize a logical unit to be accessible from the port 125 of the target disk controller 121 on the basis of the target 602 and the LUN 603.

Setting the disk subsystem 120 allows the individual LDEVs 124 to be mapped to an LUN in the port 125 of the disk controller 121. The above settings may be applied to the disk subsystem via the management port 126 by the administrative computer 140. Alternatively, the settings may be applied by the server 110 through the management port 126 using the network interface 111 or by the server 110 via the switch 130.

The administrative computer 140 or the server 110 includes the logical device mapping table 600 shown in FIG. 6 and sets the disk subsystem 120 to map each LDEV 124 to the LUN 603 of a designated target 602 with reference to the table.

FIG. 7 is an explanatory view of the server port table 700 showing ports of the servers according to the first embodiment of the present invention. The server ID 701 is an identifier of the server 110. When the same server 110 is used, the server is assigned with the same ID as the server ID 403 of the mount point control table 400. The server port 702 indicates an identifier for identifying the port 125 of each server 110. If the switch 130 is an FC switch, the server port 702 is a worldwide name (WWN) or a port ID. It can be understood from the server port table 700 which port 125 is used for when a target server 110 connects to with the switch 130.

FIG. 8 is an explanatory view of the zone control table 800 according to the first embodiment of the present invention. The zone control table 800 shows control information for zoning settings of the switch 130. Through the zoning, it is possible to define a plurality of zones in the switch 130, and limit a range of the ports 125 through which the servers 110 communicate with the disk subsystem 120 via the switch 130.

The zone control table 800 includes a zone name 801 and a member 802. The zone name 801 is an ID for identifying each of a plurality of zones set in the switch 130. The member 802 is an ID for identifying the port 125 belonging to each zone. Regarding the member, the target is a worldwide name (WWN) or a port ID when the switch 130 is a FC switch similar to the target 602 of the logical device mapping table 600.

Through the zoning, it is possible to narrow down a communication range to communications among the members 802 of the ports 125 set for the zone. The servers 110 never recognize the ports 125 other than the members of ports.

The zoning is set for the switch 130. Similar to the foregoing settings on the disk subsystem, the zoning can be set by the administrative computer 140 or the server 110 via the management port 131 or by the server 110 via the adaptor 116.

Figure 9:
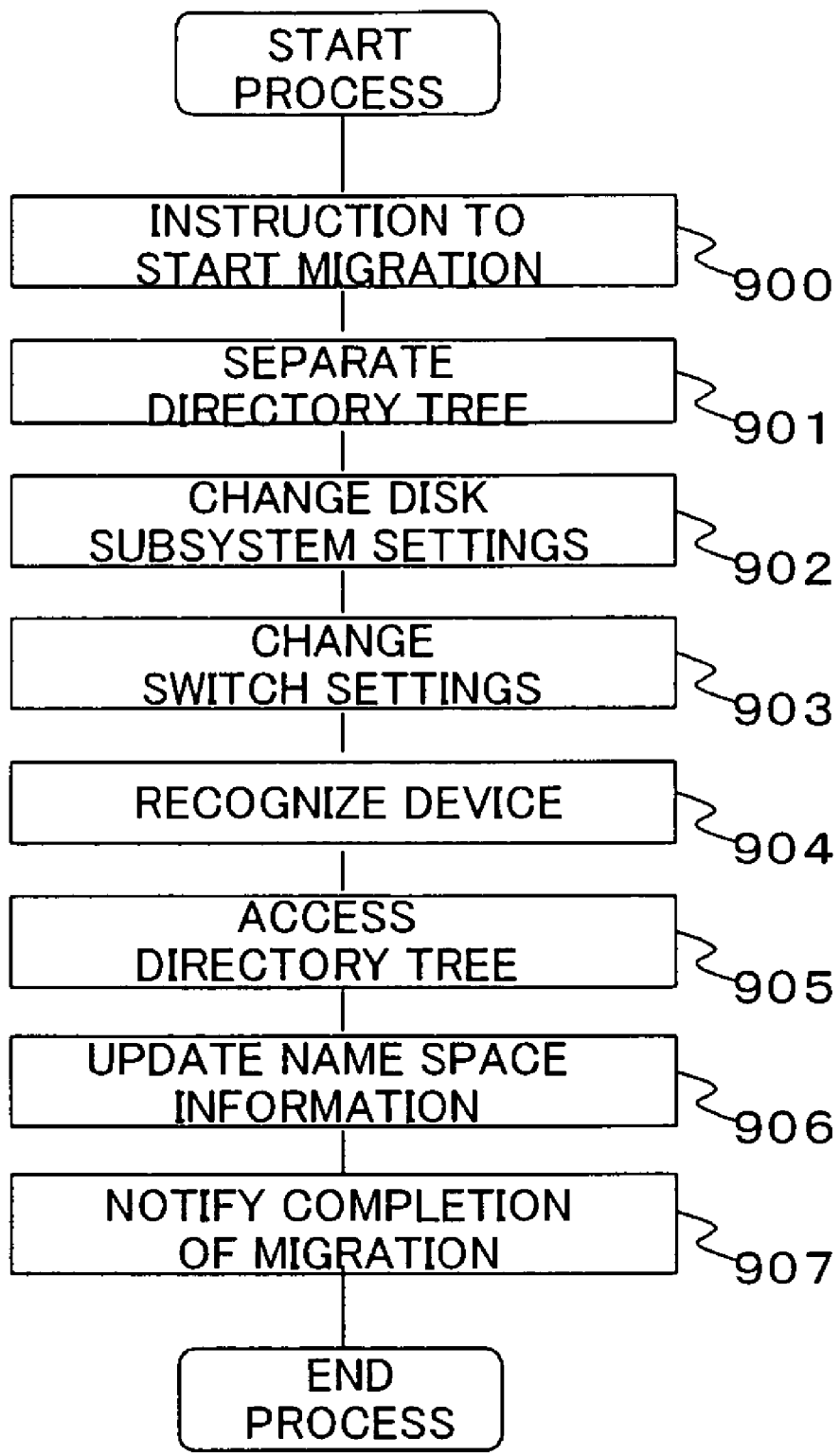
FIG. 9 is a flowchart of a migration processing executed in the first embodiment of the present invention.

FIG. 9 is a flowchart of an interserver migration processing for a directory tree.

The migration processing is started in response to a start instruction (step 900) from the administrative computer 140. The migration start instruction is sent to the server 110, with designating a directory tree and a server 110 as a migration destination. In the illustrated example of FIG. 4, when "dt1" migrates, the sever 110 of "sid1" is instructed to execute the migration of "dt1". The following description is focused on this migration for an example.

Upon receiving the migration start instruction, the server 110 separates the designated directory tree "dt1" in step 901. In the separation process, a process of writing unreflected data (dirty data) into the disk subsystem 120 regarding the directory tree "dt1" in the file system processing unit 202 and a process of defeching a logical unit recognized by the disk access unit 203 are executed. As apparent from the directory tree control table 500 of FIG. 5, the logical unit to be separated is the LDEV 124 (ldev2) storing the directory tree "dt1". As the logical device mapping table 600 of FIG. 6 shows, the LDEV 124 corresponds to the LU2 of a target "t0". In this way, the server 110 determines and separates a logical unit storing the directory tree "dt1" with reference to the mount point control table 400, the directory tree control table 500, and the logical device mapping table 600.

After the directory tree has been separated, the settings on the disk subsystem 120 are changed (step 902). The setting change may be performed by the administrative computer 140 or the server 110 as mentioned above.

The settings of the disk subsystem 120 about ldev2 are changed to the LU3 of the target "t1", for example, with reference to the logical device mapping table 600, the server port table 700, and the zone control table 800 (because the server port table 700 shows that the server port 702 of a server assigned with "sid2" is "h1" and the zone control table 800 shows that the member 802 of the zone1 in the same zone 801 as the "h1" is "t1"). The logical device mapping table 600 is updated in accordance with the change.

The switch setting change in step 903 is executed in the case where zoning should be newly set for the switch 130. The change of the zoning settings is unnecessary upon the migration of the directory tree "dt1" from the server of "sid1" to the server of "sid2". However, in the zoning example of FIG. 8, but at the time of migration to the server 110 which connects to the port 125 of a member h5 (that is sid4 with reference to the server port table 700), the settings should be changed such as adding "t0" to the zone4.

The change of the switch settings includes, in addition to the foregoing change of the zoning settings, LUN masking for allowing an access to a logical unit of a particular LUN. In the example of the zone3 in FIG. 7, the two ports "h3" and "h4" to be connected to servers belong to the same zone. In such a case, LUN masking is performed on logical units accessible from "t3", and a logical unit accessible from both the "h3" and "h4" is divided.

Step 904 corresponds to a processing executed on the server 110 as a migration destination represented as "sid2". In order to instruct a server to start this process, the server 110 of "sid1" communicates with the server 110 of "sid2" through the interserver communication path. Further, the instruction to start this process may be issued from the administrative computer 140, not from the server 110 of "sid1".

The device recognition in step 904 is executed through scanning process which searches for all accessible logical units with respect to the port "h1" connected to the server 110 of "sid2". Through the above device recognition, the server 110 of "sid2" newly recognizes the LU3 of the target "t1".

After the device recognition, the server 110 as the migration destination executes an access to a directory tree (step 905). The directory tree access process 905 is executed by mounting a directory tree of "dt1" to a root tree "/dirb" of the server 2 of "sid2".

After the directory tree access process, a name space information updating processing (step 906) is performed. In the name space information updating processing of this example, the server ID 403 in the entry regarding "dt1" in the mount point control table 400 is changed from "sid1" to "sid2". After this change, requests to obtain files through "dt1" are all responded by the server 110 of "sid2".

Finally, the administrative computer 140 is notified of the completion of the migration processing (step 907) to end the migration process.

As an alternative example, the setting change instruction in step 902 or 903 may be issued from the administrative computer 140.

In this case, the logical device mapping table 600 and the zone control table 700, and the server port table 1200 is stored in the disk 1303 by the administrative computer 140, not by the server 110. The CPU 1310 of the administrative computer 140 reads the logical device mapping table 600, the zone control table 700, and the server port table 1200 to the local memory 1311 to send a setting change instruction with reference to the tables. Further, the administrative computer 140 updates the tables in accordance with the setting change.

When the setting change instruction is issued from the administrative computer 140, the server 110 completes the processing of step 901 and then notifies the administrative computer 140 of the completion. In response to the notification, the CPU 1310 of the administrative computer 140 instructs the disk subsystem 120 or the switch 130 to execute the setting change of steps 902 and 903.

At the completion of step 903, the CPU 1310 of the administrative computer 140 notifies the server 110 of the completion of the setting change. At this time, the notified server 110 is either the server 110 as a migration source or the server 110 as a migration destination.

When the notification is sent to the server 110 as the migration source, the server 110 as the migration source communicates with the server 110 as the migration destination through the interserver communication path to instruct the server 110 as the communication destination to start the processing of step 904.

When the notification is sent to the server 110 as the migration destination, the notified server 110 as the migration destination starts the processing of step 904.

The above description has been made taking as an example the case of using one LDEV 124 as a migration target. However, the plurality of LDEVs 124 may be used. As in "dt2" of FIG. 5, the plurality of LDEVs 124 (ldev3 to ldev5) are allocated to the directory tree. At this time, the migration is executed with respect to the plurality of LDEVs 124 (ldev3 to ldev5).

Figure 10:
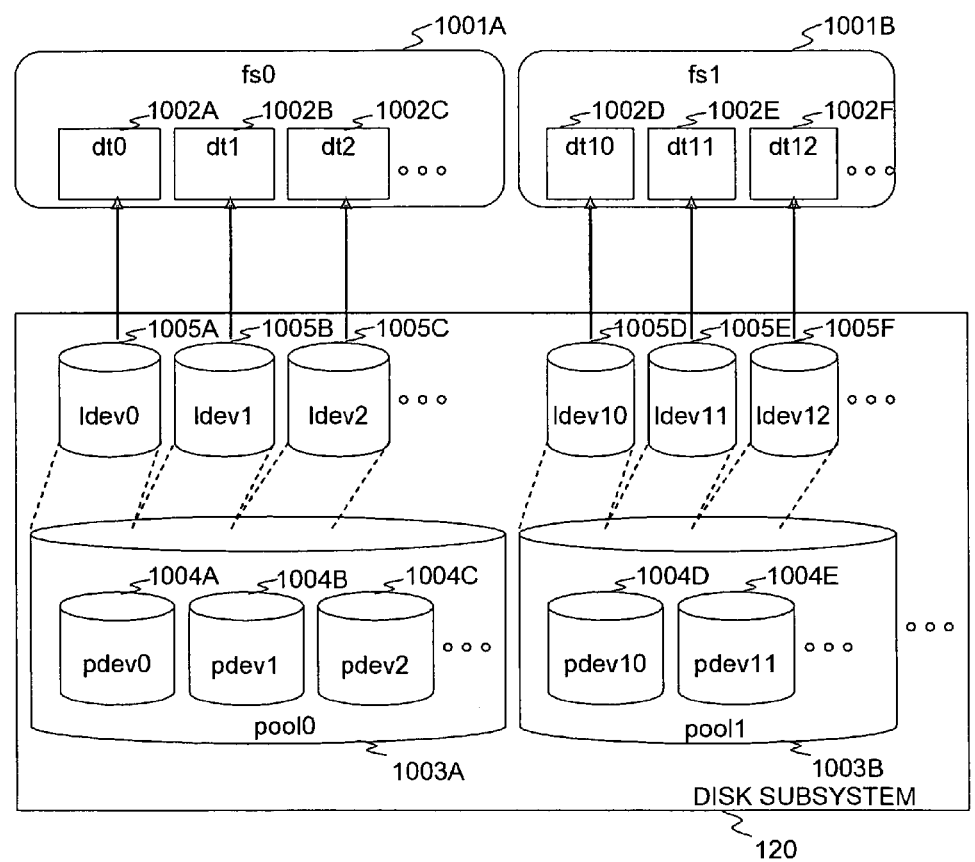
FIG. 10 is an explanatory view of a directory tree allocating method according to the first embodiment of the present invention.

The migration processing described in this embodiment is performed for a file system or a directory tree as a part of the file system. On the other hand, in the disk subsystem 120, the switching is carried out on the basis of LDEV 124. Thus, in order to execute the migration on the basis of directory tree, different LDEVs should be allocated to each directory tree. FIG. 10 shows an example of how to allocate different LDEVs to each directory.

In the disk subsystem 120, a plurality of logical devices 1004 having a physical storage capacity (PDEVs) constitute a pool 1003. The LDEV 1005 is a virtual device defined on each pool, which is originally defined for its size, and its physical storage capacity is not assigned. If a storage area is required for writing to the LDEV 1005, for example, an area of the physical device 1004 is assigned as a data storage area in the pool 1003.

Meanwhile, file systems 1001 each include a plurality of directory trees 1002. The file systems 1001A and 1001B are assigned to pools 1003A and 1003B respectively. The directory trees 1002 are assigned to LDEVs 1005 respectively on the pool 1003 assigned to each file system 1001.

This allows each file system 1001 to take up a storage area of the pool 1003, allows the directory trees 1002 in the same file system 1001 to share the storage area, and allows migration with switchover on the basis of directory tree 1002 assigned to the LDEV 1005.

Further, the management of the capacity of the storage area assigned to the LDEV 1005 enables the management of the capacity on the basis of directory tree 1002.

Further, the maximum possible value of the storage capacity allocated to the directory tree 1002 can be limited depending on a defined size of the LDEV 1005.

Next, the interface for managing the storage system 100 according to the first embodiment of the present invention is described. The interface is provided to an administrator of the storage system 100 by the administrative computer 140.

Figure 11:
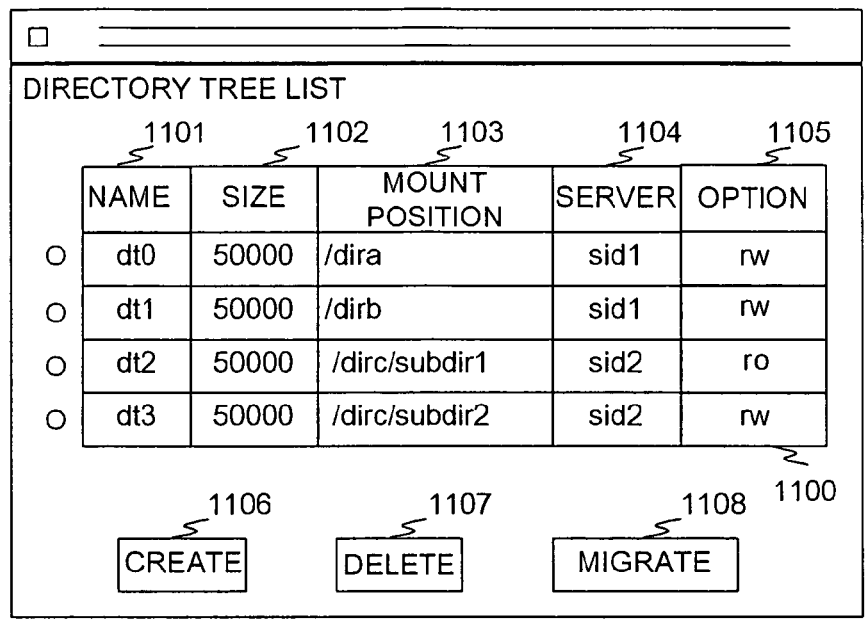
FIG. 11 is an explanatory view of a directory tree list display screen displayed on a management screen of an administrative computer according to the first embodiment of the present invention.

FIG. 11 is an explanatory view of a directory tree list display screen displayed on a management screen for the administrative computer 140 according to the first embodiment of the present invention.

The directory tree list display screen includes a directory tree list 1100, a button "create" 1106, a button "delete" 1107, and a button "migrate" 1108.

A name 1101 is a name of a directory tree stored in each LDEV 124. In the illustrated example of FIG. 11, the same directory tree as in FIG. 3 is stored in each LDEV 124.

A size 1102 is a storage capacity (megabytes) set for each directory tree.

A mount position 1103 is a mount point of each directory tree. In the illustrated example of FIG. 11, the same mount point as the path 402 of FIG. 4 is set.

A server 1104 is an identifier of the server 110 managing each directory tree. In the illustrated example of FIG. 11, a relation between each directory tree and the server 110 managing a corresponding directory tree is similar to that of FIG. 4. Therefore, in the field of server 1104, the same value as the server ID 403 of FIG. 4 is recorded.

An option 1105 is an attribute set for each directory tree. In the illustrated example of FIG. 11, the option 1105 of "dt0", "dt1", and "dt3" is set "rw" (read/write). This means that neither a write prohibition attribute or read prohibition attribute is set for the three directory trees. That is, the client 150 can execute data writing and reading with respect to the three directory trees.

On the other hand, the option 1105 of "dt2" is set to "ro" (read_only). This means that the write prohibition attribute is set for "dt2". That is, the client 150 cannot write data to "dt2".

The button "create" 1106 is used for creating a new directory tree.

The button "delete" 1107 is used for deleting a directory tree. For example, an administrative selects a deletion-target directory tree and clicks on the button "delete" 1107 to thereby delete the selected directory tree. The selection of the directory tree may be executed by marking (e.g., mouse-clicking) a circular check box with a pointing device (not shown) on the left of the field of the name 1101 of FIG. 11. The same applies to the button "delete" 1107.

The button "migrate" 1108 is used for migration of the directory tree. For example, an administrator selects a migration-target directory tree and clicks the button "migrate" 1108 to thereby display another screen (see FIG. 11) and execute the migration.

Figure 12:
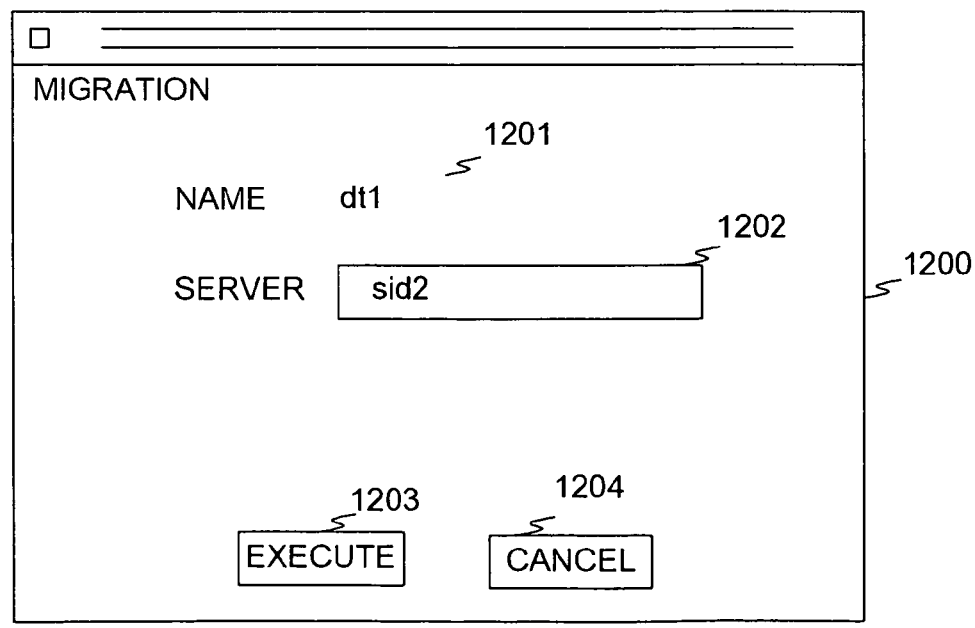
FIG. 12 is an explanatory view of a migration operation screen displayed on the control screen of the administrative computer according to the first embodiment of the present invention.

FIG. 12 is an explanatory view of a migration operation screen displayed on the management screen of the administrative computer according to the first embodiment of the present invention.

The migration operation screen is displayed when the administrator selects any directory tree on the directory tree list display screen (FIG. 11) and clicks the button "migrate" 1118. FIG. 12 shows a migration operation screen displayed when the administrator selects "dt1" on the directory tree list display screen by way of example.

The migration operation screen includes a name field 1201, a server entry field 1202, a button "enter" 1203, and a button "cancel" 1204.

The name field 1201 displays a name of a directory tree selected by an administrator. In the illustrated example of FIG. 11, "dt1" is displayed.

In the server entry field 1202, the ID of the server 111 as the migration destination is entered. In the illustrated example of FIG. 12, "sid2" is entered. This means that the administrator intends to transfer the directory tree "dt1" to the server 2.

The button "enter" 1203 is used for executing the migration. The administrator clicks the button "enter" 1203 to start the migration of "dt1" to the server 2. The button "cancel" 1204 is used for canceling the migration. When the administrator clicks the button "cancel" 1204, the migration operation screen is closed to redisplay the directory tree list display screen.

According to this embodiment, it is possible to execute migration of a file system or a part of the file system between servers in the storage system without copying the file system or a part of the file system between disk devices.

Further, according to this embodiment, upon the migration, the server recognizes an additional disk device, whereby more devices can be used than the limit on the number of devices recognizable by one server in the storage system.

What is claimed is:

1. A file system migration method used in a storage system that includes a plurality of servers and a disk subsystem coupled to the plurality of servers, having all or a part of at least one file system stored in a logical device of the disk subsystem and an administrative computer, and providing a file name space to a client computer by the plurality of servers the file system migration method comprising:

managing a first information indicating a relationship between a plurality of path names of the file name space and a plurality of server identifiers, referencing, in response to an instruction to execute migration of the file system from a first server to a second server out of the plurality of servers, a second information indicating a relation between the logical device of the disk subsystem and a logical unit used for the plurality of servers to recognize the logical device;

sending an instruction to update the relation between the logical device and the logical unit to the second server;

causing the second server to newly recognize the logical unit, in response to the instruction to update, and after recognition of the logical unit, updating the first information to indicate that a path name previously managed by the first server is related to the second server, to thereby migrate all or at least part of the file system without executing a data copy operation.

2. The file system migration method used in a storage system according to claim 1, wherein an administrative computer sends the instruction to execute migration of the file system from the first server to the second server.

3. The file system migration method used in a storage system according to claim 1, wherein the first server sends the instruction to update the relation between the logical device and the logical unit to the second server.

4. The file system migration method used in a storage system according to claim 1, wherein an administrative computer sends the instruction to update the relation between the logical device and the logical unit to the second server.

5. The file system migration method used in a storage system according to claim 1, wherein the relation between the logical device and the logical unit is on the basis of a name for identifying the logical device, a target number for identifying a port of a disk controller coupled to the logical device, and a logical unit number corresponding to a target.

6. The file system migration method used in a storage system according to claim 1, wherein the relation between the logical device of the disk subsystem and the logical unit used for the server to recognize the logical device is referenced in a logical device mapping table, a server port table, and a zone control table.

7. The file system migration method used in a storage system according to claim 1, wherein the instruction to execute migration of the file system is issued while designating a directory tree identifier of a directory tree control table.

8. The file system migration method used in a storage system according to claim 1, wherein in response to the instruction to execute migration of the file system from the first server to the second server, the file system as a migration target is separated and then a setting change processing is carried out to send the migration instruction to the second server, and in response to the migration instruction, the second server newly recognizes the logical unit through a scanning processing to access the file system and then updates an identifier of the server managing all or a part of the file system to complete a migration processing.

9. The file system migration method used in a storage system according to claim 1, wherein the plurality of servers are servers of a plurality of network attached storages coupled to a network.

10. A storage system, comprising: a plurality of servers providing a file name space to a client computer; and
   a disk subsystem coupled to the plurality of servers, wherein the disk subsystem includes a logical device for storing all or a part of at least one file system,
   wherein each of the plurality of servers includes a control table indicating a relationship between a plurality of path names of the file name space and a plurality of server identifiers,
   wherein each of the plurality, of servers includes a mapping table for managing a relation between a logical device of the disk subsystem and a logical unit used by the server to recognize the logical device, and
   wherein the mapping table is referenced to send an instruction to update the relation between the logical device and the logical unit to the second server in response to a migration instruction from a first server to a second server out of the plurality of servers, and, in response to the instruction to update, the second server newly recognizes the logical unit, and
   wherein, after recognition of the logical unit, the plurality of servers update the control table for indicating that a path name previously managed by the first server is related to the second sewer, to thereby migrate all or at least part of the file system without executing a data copy operation.

11. The storage system according to claim 10, wherein an administrative computer sends the instruction to execute migration of the file system from the first server to the second server.

12. The storage system according to claim 10, wherein the first server sends the instruction to update the relation between the logical device and the logical unit to the second server.

13. The storage system according to claim 10, wherein the relation between the logical device and the logical unit is on the basis of a name for identifying the logical device, a target number for identifying a port of a disk controller coupled to the logical device, and a logical unit number corresponding to a target.

14. The storage system according to claim 10, wherein the second server newly limits a communication range using the server port table and the zone control table to recognize the logical unit and update an identifier of the server.

15. The storage system according to claim 10, wherein the plurality of servers are servers of a plurality of network attached storages coupled to a network.

16. The storage system according to claim 10 comprising:
   an administrative computer including a management screen for displaying a directory tree list display screen including a directory tree list and a migrate button,
   wherein the administrative computer selects a directory tree from the directory tree list, designates a file system as a migration target, and operates the migrate button to send the migration instruction.

17. The storage system according to claim 16, wherein the directory tree list display screen further includes a create button for creating a new directory tree and a delete button for deleting a selected directory tree on the management screen.

18. The storage system according to claim 16, wherein a migration operation screen including a name field, a server entry field, an enter button, and a cancel button can be displayed on the management screen, and the migrate button is clicked to display the migration operation screen on the management screen.

19. The storage system according to claim 16, wherein a migration operation screen including a name field, a server entry field, an enter button, and a cancel button is displayed on the management screen, and the execute button is clicked to start migration to the second server.

20. The storage system according to claim 16, wherein a migration operation screen including a name field, a server entry field, an enter button, and a cancel button is displayed on the management screen, and the cancel button is clicked to close the migration operation screen, cancel the migration, and redisplay the directory tree list display screen.

21. The file system migration system method used in a storage system according to claim 1, wherein the migration is carried out without copying a directory tree of the file system.

22. The storage system according to claim 10, wherein the migration is carried out without copying a directory tree of the file system.

23. The storage system according to claim 16, wherein the migration is carried out without copying a directory tree of the file system.

* * * * *